No. 779,111. PATENTED JAN. 3, 1905.
F. H. BALL.
BRAKE.
APPLICATION FILED JUNE 29, 1903.
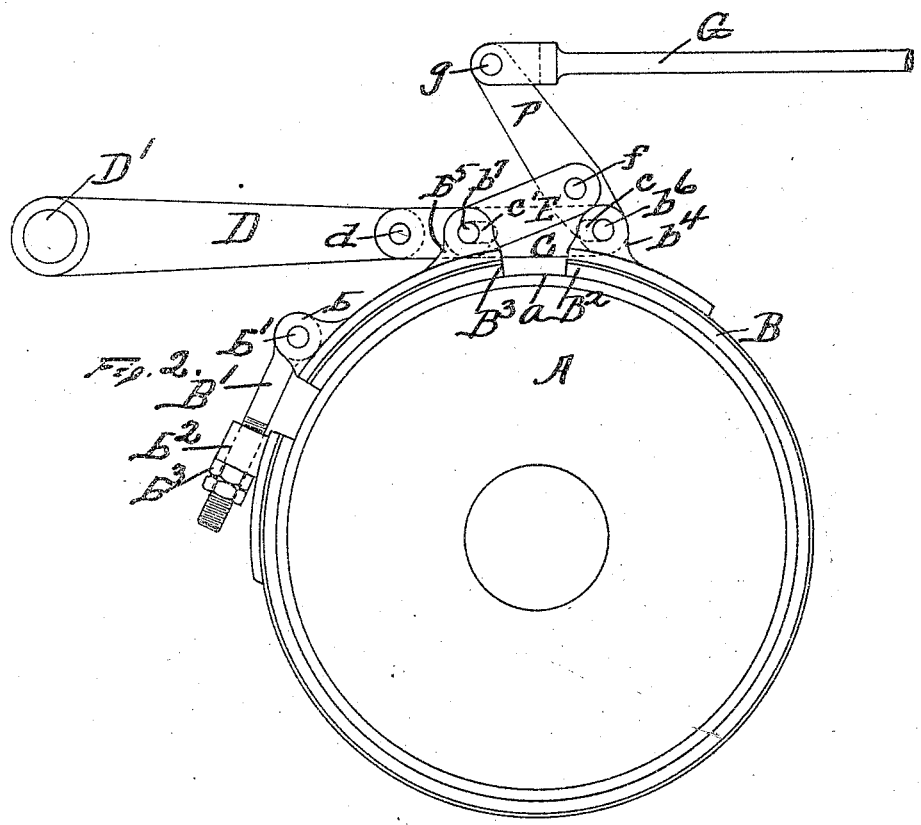

No. 779,111.

Patented January 3, 1905.

UNITED STATES PATENT OFFICE.

FRANK H. BALL, OF PLAINFIELD, NEW JERSEY.

BRAKE.

SPECIFICATION forming part of Letters Patent No. 779,111, dated January 3, 1905.

Application filed June 29, 1903. Serial No. 163,609.

*To all whom it may concern:*

Be it known that I, FRANK H. BALL, a citizen of the United States, residing at Plainfield, in the county of Union and State of New Jersey, have invented new and useful Improvements in Brakes, of which the following is a specification.

This invention relates to brakes; and it consists in certain improvements in the construction thereof, as will be hereinafter fully described, and pointed out in the claims.

The object of the invention is to provide a brake which will be equally effective with the wheel or object to be restrained running in either direction, and is particularly applicable to brakes for automobiles, where it is desirable to have the brake operate with the vehicle running in either direction.

The invention is illustrated in the accompanying drawings, as follows: Figure 1 is a plan view of the brake; Fig. 2, a side elevation of the same.

A marks the friction-wheel, which in the construction shown is the object the movement of which is restrained; B, the band. This is of the split-band variety and operates on the friction-surface $a$ on the friction-wheel A. The band is broken at one end and provided with the lug $b$. A bolt B' is secured to this lug by the pin $b'$ and extends through the lug $b^2$. By operating the nut $b^3$ the length of the brake-band B may be adjusted.

At the operating ends of the brake-band there are arranged the lugs $b^4$ and $b^5$. The pins $b^6$ and $b^7$ extend through these lugs, respectively, and the links C connect the band by extending from the pin $b^6$ to the pin $b^7$. The openings in the links $c$ and $c'$ are elongated, so that with the friction-wheel running toward the right the end B$^2$ is retained in relatively fixed position, while the end B$^3$ is relatively free and becomes the end of the brake which is operated to set it. The slot $c'$ permits of a movement of the end B$^3$ to so set the brake. On the other hand, where the friction-disk A is running in the opposite direction, or toward the left, the end B$^3$ becomes the relatively fixed end and the brake is set by operating the free end B$^2$, the slot $c$ permitting this setting movement. The link C is held in a comparatively stationary position by being attached to a lever D through the medium of the pin $d$. The lever D is attached to some convenient shaft or part of the carriage D'.

It is desirable that the brake shall be set by a movement of the operating mechanism in the same direction without regard to what way the vehicle may be running. For this reason I provide an operative mechanism, as follows: The lever F is pivoted on the pin $b^6$. A link E connects the pin $b^7$ with the lever F, the pin $f$ connecting with the lever F. The operating-rod G is connected with the lever F by means of a pin $g$. It will be observed that when the wheel A is running toward the right and the end B$^2$ being the relatively fixed end makes the pin $b^6$ the fulcrum for the lever F, by means of which the free end B$^3$ is operated. Where the disk A is running in the opposite direction, the pin $b^7$ becomes the fulcrum sustaining the force of the lever F in operating the end B$^2$. It will be readily observed that the operating mechanism sets the brake with substantially equal efficiency with the friction-wheel running in either direction and that it does so with force exerted in the same direction in each instance—that is, the rod G is drawn forward to set the brake without regard to the direction in which the disk A is running. The lever F and link E form, in effect, a toggle-joint for bringing the ends of the band together.

What I claim as new is—

1. In a brake the combination of a friction-wheel; a split band on said wheel; means for holding either end of said band against the action of the wheel; and for permitting a movement of the free end of the band, a lever connected to one end of the band; and a link connecting the lever with the opposite end of the band.

2. In a brake the combination of the friction-wheel A; the brake-band B having the lugs $b^4$ and $b^5$ and pins $b^6$ and $b^7$; the slotted links C connecting the ends of the brake-band; means attached to the link C for holding it in a relatively stationary position; the lever F pivoted on the pin $b^6$; the link E connecting the pin $b^7$ with the lever F and the operating-rod G.

In testimony whereof I have hereunto set my hand in the presence of two subscribing witnesses.

FRANK H. BALL.

Witnesses:
   E. S. BOYER,
   HENRIETTA MAHLAR.